United States Patent [19]

Jensen

[11] 4,269,400
[45] May 26, 1981

[54] STACKED, RESILIENT ISOLATOR COMPONENTS

[75] Inventor: William S. Jensen, Canoga Park, Calif.

[73] Assignee: Barry Wright Corporation, Watertown, Mass.

[21] Appl. No.: 36,248

[22] Filed: May 4, 1979

[51] Int. Cl.³ .......................... F16F 3/08; F16F 1/34; F16F 1/52

[52] U.S. Cl. ................................... 267/153; 188/1 B; 248/615; 248/632; 267/63 R; 267/140.5; 267/141; 267/160; 267/162; 267/163; 267/181

[58] Field of Search ............ 188/1 B; 267/63 R, 141, 267/153, 160, 161, 162, 163, 181, 140.3, 140.5; 248/603, 604, 615, 626, 632, 638, 660, 661

[56] References Cited

U.S. PATENT DOCUMENTS

| | | |
|---|---|---|
| 2,117,264 | 5/1938 | Workman . |
| 2,819,060 | 1/1958 | Neidhart . |
| 3,003,738 | 10/1961 | Horovitz .......................... 267/141.1 |
| 3,109,639 | 11/1963 | Nicolaisen .......................... 267/153 |
| 3,391,892 | 7/1968 | Neidhart et al. . |
| 3,429,533 | 2/1969 | Harkness .............................. 248/637 |
| 3,831,923 | 8/1974 | Meldrum ......................... 267/153 X |

FOREIGN PATENT DOCUMENTS

| | | | |
|---|---|---|---|
| 457925 | 3/1928 | Fed. Rep. of Germany ........... 267/162 |
| 1242234 | 8/1960 | France ..................................... 267/162 |
| 16905 | of 1910 | United Kingdom ..................... 267/162 |

Primary Examiner—George E. A. Halvosa
Attorney, Agent, or Firm—Milton E. Gilbert; Gary E. Ross

[57] ABSTRACT

An isolator designed to prevent transmission of shock and vibration from one structure to another, comprising a device structured to provide orthogonal excursion in three directions and comprising a plurality of nested, concentrically-arranged component structures, each of which is structured to permit orthogonal excursion and a connector element for securing structures in nested parallel relation so that the composite resistance to displacement is the sum of the resistances of the individual components. The component structure may decrease in size from the outside to the inside or be all of the same size.

9 Claims, 5 Drawing Figures

STACKED, RESILIENT ISOLATOR COMPONENTS

BACKGROUND OF THE INVENTION

Resilient mountings designed to minimize transmission of vibration and shock from one structure to another comprising two or more nested components are disclosed in U.S. Pat. Nos. 2,117,264; 2,819,060; 3,003,738; and 3,391,892. None of the structures shown in the said patents provide for orthogonal displacement in approximately equal amounts in three directions, nor do any of them show a composite structure comprised of several structures embodying the characteristics of orthogonal displacement in approximately equal amounts in three directions which collectively provide a structure embodying orthogonal excursion which is the sum of the orthogonal excursion rate of the individual components. An object of the invention is to provide a composite structure embodying the characteristics of equal orthogonal displacement in its composite and in its component structure. Other objects are to provide a structure, the components of which can be easily molded in a one-step molding process using an elastomer or plastic and easily secured to each other to provide a composite structure.

SUMMARY OF THE INVENTION

As herein illustrated, the device of this invention is designed to minimize the transfer of shock and vibration from one component to another and comprises a plurality of nested, concentrically-arranged component structures, each of which is structured to provide orthogonal excursion from the outermost structure to the innermost structure and means for securing said structures in said nested relation such that the composite resistance to deformation is the sum of the resistances of the several components. Each component structure comprises spaced, parallel end parts and intermediate the end parts, a plurality of ribs spaced at equal distances peripherally about a common axis and connected at their ends to the end members at different radial distances from said common axis. The end members in the composite structure are secured in engagement against displacement relative to each other and the ribs from the outer component to the inner component are progressively of lesser radius of curvature such that ribs are radially spaced with respect to the axis of the composite structure. One of the end components is of circular cross section and the other of rectangular cross section and containing a central opening and the ribs are connected, respectively, to the end members at the periphery of the end member of circular cross section and to the face of the end member of rectangular cross section about the circular opening therein, said circular opening being of larger diameter than the diameter of the end of circular cross section such that the ribs diverge from the end of circular cross section to the end of rectangular cross section. The ribs intermediate their ends are concavo-convex and are centered on or about the common axis of the components of the structure. Each of the end members of circular cross section contains a central hole and there is means in the form of a bolt inserted through the holes of the several components for securing them in stacked engagement. The component structures may be of progressively smaller dimension from the outside to the inside or all of the same size.

The invention will now be described in greater detail with reference to the accompanying drawings, wherein.

Figure 2:
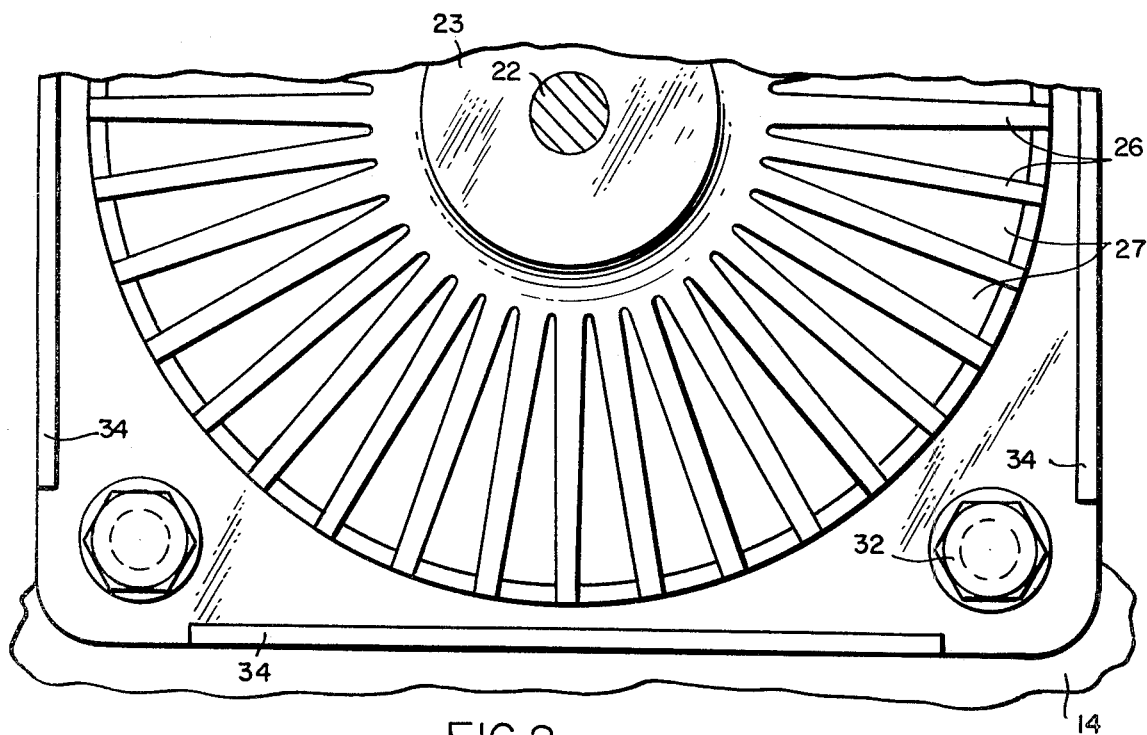
FIG. 2 is a fragmentation plan view of FIG. 1 on a line 2—2 of FIG. 1.
Figure 1:
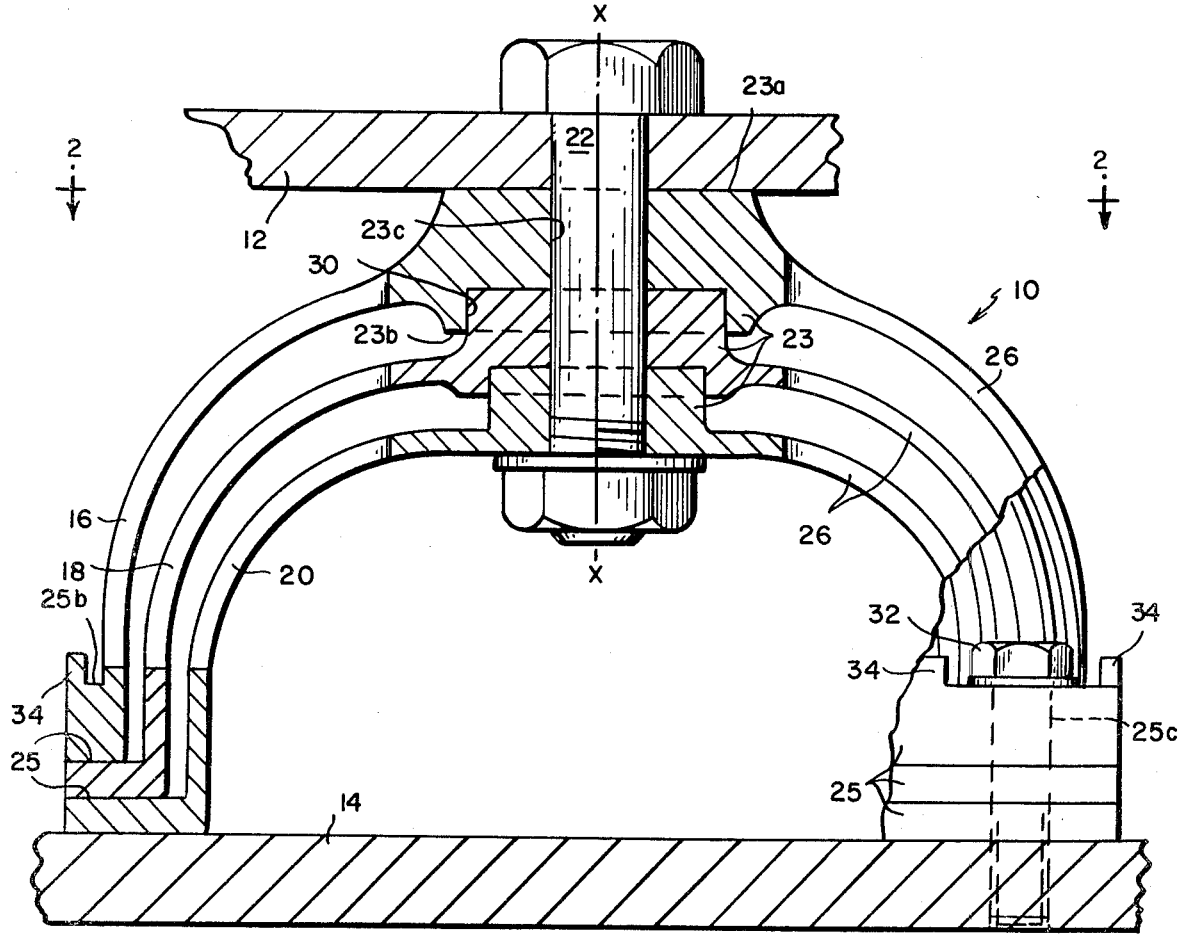
FIG. 1 is a diametral section of the device of this invention located between structures which are desirably to be isolated the one from the other for the purpose of minimizing transfer of vibration and shock from one structure to the other wherein the component structures decrease in size from the outermost component to the innermost component.
Figure 3:
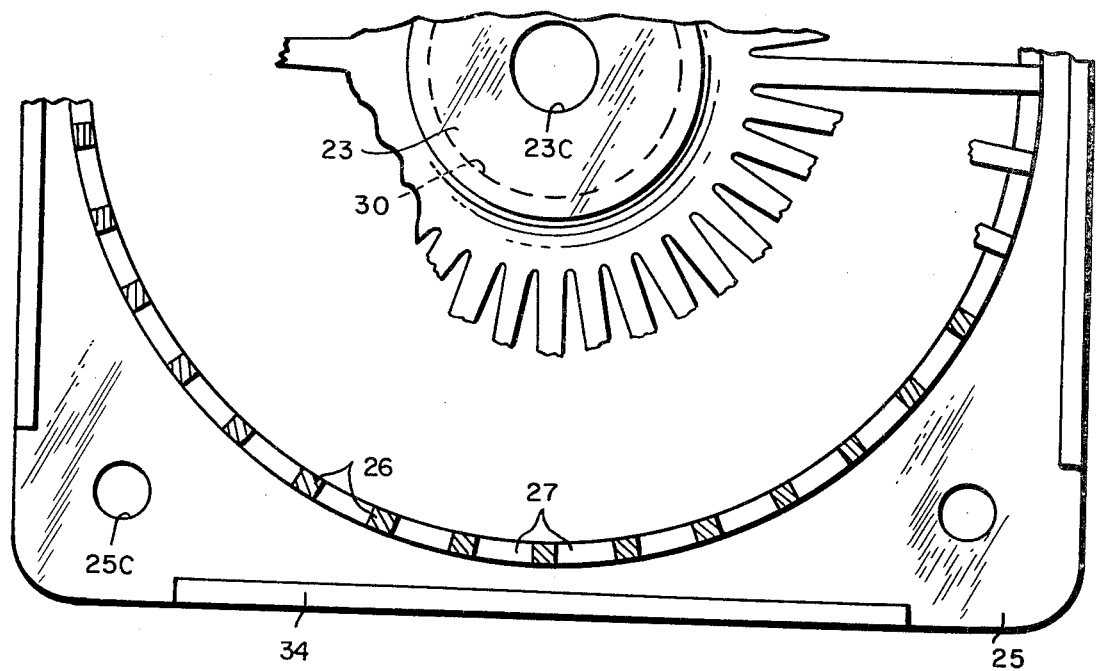
FIG. 3 is a fragmentary view taken on the line 3—3 of FIG. 1.
Figure 4:
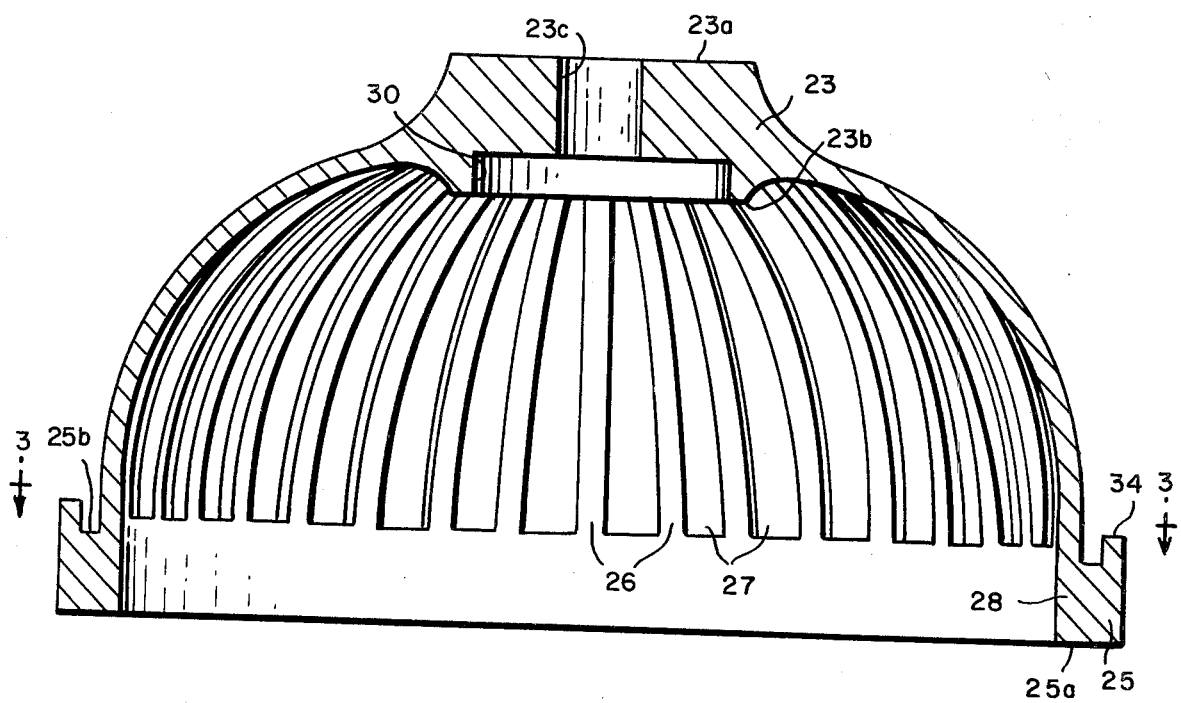
FIG. 4 is a diametral section of the outermost component of the device of FIG. 1.

Referring to the drawings, FIG. 1, the structure 10 which is designed to be interposed between two structures represented at 12 and 14 for the purpose of minimizing transfer of shock and vibration from one structure 12 to the other structure 14 or vice-versa is herein designed to permit substantially equal orthogonal displacement in three directions as opposed to such structures as are presently known.

The structure 10 in one form, FIGS. 1 to 4, is comprised of a plurality of component structures 16, 18 and 20, FIG. 1, which are mounted in nested concentric relation upon a bolt 22, the axis X-X of which is at the geometric centers of the several components. Each of the components 16, 18 and 20 is structured so as to provide for approximately equal orthogonal displacement in three directions, and the successive components from the outermost to the innermost while of the same configuration, are of smaller dimension, and each comprises axially-spaced end members 23 and 25, FIG. 4, and intermediate the end members a plurality of circumferentially-spaced ribs 26 which connect the end members. The end members 23 are of circular cross section, have spaced, parallel outer and inner planer surfaces 23a, 23b and center holes 23c. The end members 25 are of rectangular cross section, contain circular center openings 28 which are larger in diameter than the peripheral diameters of the end members 23, outer and inner planer surfaces 25a, 25b, and at their corners holes 25c. The end of the ribs are integrally connected with the peripheral surface of the end members 23 and with the faces of the end members 25 about the circular openings 28 therein, so that the ribs diverge from the end member 23 outwardly and axially to the end members 25 and are convexly concave, their radius of curvature being centered on or about the axis X-X of the composite structure. The ribs define peripherally of the structures peripherally-spaced flutes or slots 27 which are generally triangular, having their bases at the end parts 25 and their apices at the end parts 23. The ribs are substantially hemispherically disposed with respect to the axis of the composite structure, and of rectangular cross section. There are fillets at their junctions of the ribs with the end members 23.

Desirably, the planer surfaces 23b of each of the end members 23 contain a centrally-located circular recess 30 for receiving the end member of the component inwardly thereof so that the several components are stacked on the bolt in fixed relation to each other. The depth of the recesses 30 corresponds to the thickness of the end members 25.

The end members 25 are of corresponding outside dimension and the holes 25c at the corners are aligned for receiving bolts 32 for securing them to each other and to the structure 14. Desirably, the end member of the outermost component is provided at its rear side with a reinforcing rib 34 along each of its four sides. The inner structures have no such ribs.

In the composite structure, the ribs 26 are peripherally-spaced about the axis of the bolt 22 and radially-spaced from the axis of the bolt at opposite ends at different distances so that there are spaces between the ribs of the successive components which permit free movement of the ribs relative to each other, thus retaining their orthogonal characteristic of equal excursion in three directions and thus providing a composite structure in which the resistance to orthogonal excursion in three directions is the sum of the resistance of the orthogonal excursion of each of the individual components. The ribs emanate from the end parts 23 at equal radial distances from the axis X-X of the composite structure and terminate at the end parts 25 in a common plane perpendicular to the axis X-X.

The structure as designed is extremely simple since each of the components is comprised solely of elastomer, for example, a polyvinyl chloride with a durometer of 65" A" scale and so can be easily molded in such quantity as to make the composite structure economical to manufacture as well as efficient in its function. By the simple expedient of adding components, the structure can be accommodated to the load to be supported with the advantage that a large range of spring ratio is provided for a given value.

Figure 5:
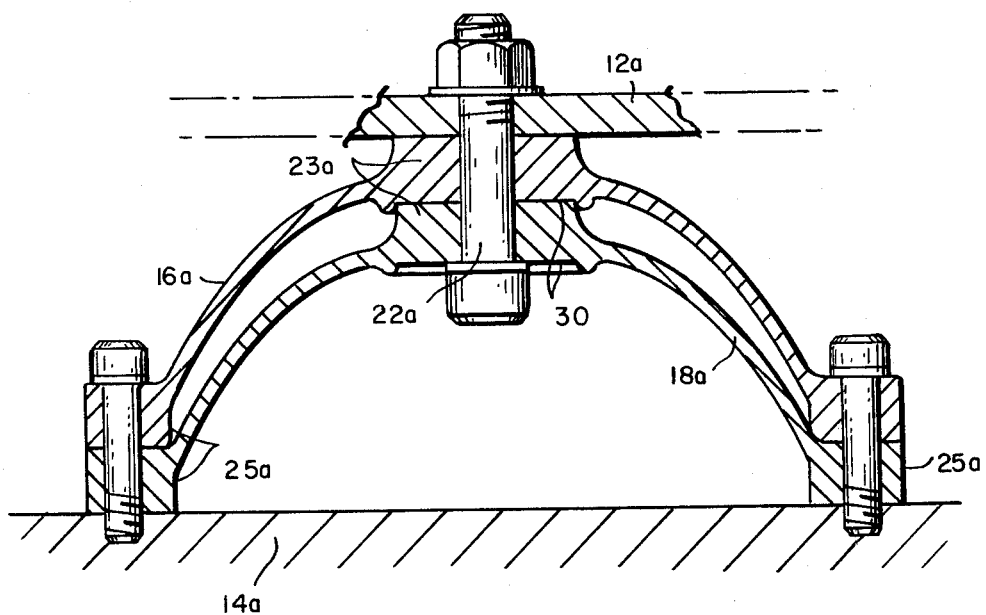
FIG. 5 is a diametral section of the device wherein the components are all of the same size.

In the structure thus far described, the component structures decrease in size from the outermost component to the innermost component. The components may, however, be made all of the same size, as illustrated in FIG. 5, wherein there are two concentrically-arranged components 16a, 18a. The end members 23a are of the same diameter and thickness and contain at their inner sides recesses 30a of the same size. The end members 25a are also of the same size. In other respects, the component structures provide the orthogonal excursion described above with respect to FIGS. 1 to 4 and afford the advantage that, being of the same size, molding costs can be minimized since all of the components may be made by a single step molding operation and may be stacked to achieve any required load rating. Although the allowable orthogonal excursion may not be exactly equal and the spring rates may not be identical, the advantage of lowering production costs more than compensates where the conditions to be corrected are not critical.

It should be understood that the present disclosure is for the purpose of illustration only and includes all modifications or improvements which fall within the scope of the appended claim.

I claim:

1. An isolator comprising a plurality of concentrically-arranged, nested, bell-shaped components stacked in parallel about a common axis, each component comprising spaced, parallel end parts centered on said common axis, and a plurality of arcuate ribs spaced at equal distances peripherally about said common axis, said ribs being connected at their opposite ends to the respective end parts at different radial distances from said common axis, said ribs defining slots between adjacent ribs including portions at least as wide as the ribs, the ends of the ribs and slots in the respective components at one end of circular shape being spaced axially along said common axis and at the other ends terminating in a common plane perpendicular to said axis which is axially spaced from the circular end parts, said ribs being unconstrained relative to each other in each component and in adjacent components and means securing the end members at opposite ends in engagement against displacement relative to each other.

2. An isolator according to claim 1 wherein the circular end parts are of substantial axial thickness and the end of the ribs connected thereto stem from the peripheral edges of said end parts intermediate their opposite ends.

3. An isolator according to claim 2 wherein the opposite ends of the circular end parts are planar surfaces perpendicular to the axis of the end parts.

4. An isolator according to claim 2 wherein the ribs of the successive components emanate from the end parts of circular cross section at substantially corresponding radial distances from the axis of the end parts.

5. An isolator according to claim 1 wherein said plane is a plane containing the ends of the ribs of the outermost component.

6. An isolator according to claim 1 comprised wholly of an elastomer.

7. An isolator according to claim 1 capable of a range or resistance to displacement by the addition or removal of components.

8. An isolator according to claim 1 wherein said components are successively of smaller dimension, but of corresponding configuration such that the ribs in successive components are spaced radially from each other with respect to the axis of the composite structure.

9. An isolator according to claim 1 wherein the means for securing the end members at opposite ends in engagement against displacement relative to each other comprise a bolt connecting the centers of the end members at the one end to each other and bolts connecting the corners of the respective end members at the other end to each other.

* * * * *